June 25, 1963   P. KAULFUSS ETAL   3,094,897
SAFETY DEVICE FOR AUTOMATIC WORK LOADER
Filed April 12, 1961
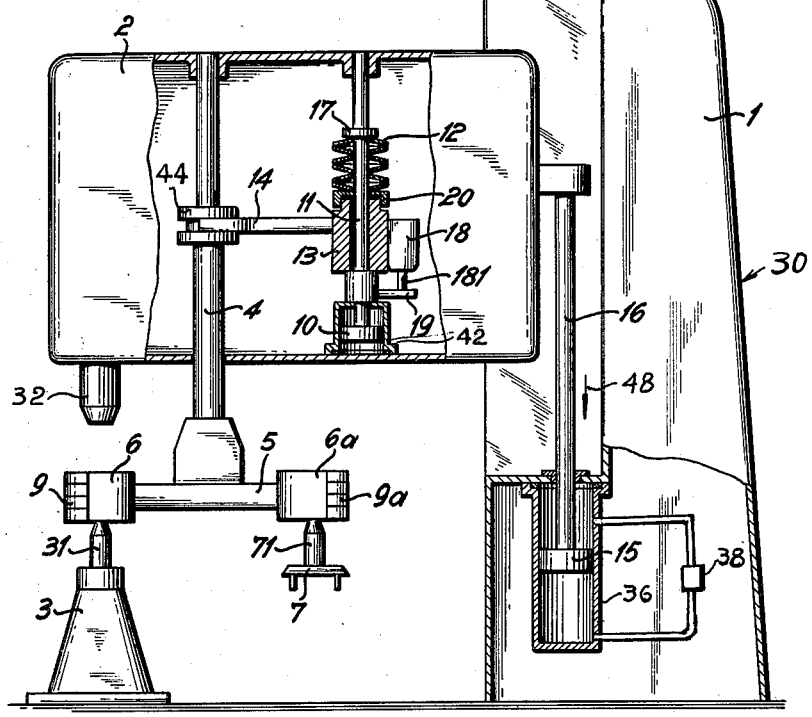
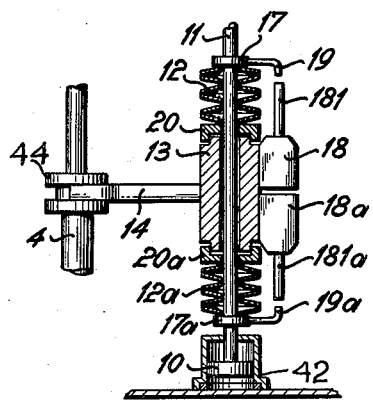
INVENTOR
PAUL KAULFUSS
KARLHEINZ SPEYER

United States Patent Office 3,094,897
Patented June 25, 1963

3,094,897
SAFETY DEVICE FOR AUTOMATIC WORK LOADER
Paul Kaulfuss, Schorndorf, Wurttemberg, and Karlheinz Speyer, Ludwigsburg, Wurttemberg, Germany, assignors to Hermann Pfauter, Schwieberdingerstr, Germany, a firm of Germany
Filed Apr. 12, 1961, Ser. No. 102,531
Claims priority, application Germany Apr. 13, 1960
7 Claims. (Cl. 90—1)

This invention relates in general to automatically operating machines such as hobbing or milling machines and in particular to a new and useful device for the protection of automatic work changing equipment for such machines.

The present invention is particularly concerned with a hobbing machine or automatic miller. In order to save labor of the operating personnel of such machines for the mass production of various items, they are equipped with automatic work changing devices to which the work is transferred by automatic conveyor equipment.

In a preferred arrangement, such machines include a swivel head which holds one or more workpieces, which head is carried by a movable plunger on the tail stock of the machine. The swivel head advantageously includes two automatic loading grippers which are provided for holding the workpieces and for transferring the work after it is machined to a conveyor device. During operation the tail stock is arranged to lower the swivel head over one workpiece on the conveyor device and on the clamping device, whereupon the jaws of the grippers are arranged to engage the workpiece. A following upward movement of the tail stock support lifts the workpieces from their mountings. The swivel head performs a swivel motion after the workpieces on one end have been operated upon and the work to be machined is then located over the clamping device of the machine and the already machined work is moved over the conveyor device. The machine includes an arrangement where the tail stock together with an actuating plunger moves in a direction toward clamping engagement of the workpieces on the machine centering devices, on the one hand, and movement of the finished workpieces away on the conveyor device, on the other hand.

In the operation of machines of this character, the normal sequence of the changing process takes place under the assumption that the clamping device is empty and that the work can be received by the centering device at the work station without hindrance. Should it occur, however, that the earlier machine work for some reason or other still remains in the clamping device due to a defect in the operation of the automatic mechanism, or that the centering arbor cannot be completely inserted into the bore of the work without the application of extremely high forces, then the changing device may break or the workpiece may become destroyed by improper machining, or the misalignment of the workpiece may cause destruction of the tool.

The events set forth above can further cause disturbances in the automatic sequence of operation, since the loading process is not completed correctly. The machine would continue to run and even if the tool or the workpieces are not destroyed there is a loss in the time operation of the machine. In such instances it would be up to chance that the defect of the operation of the machine would be discovered. The loading grippers would attempt to slide the work into the improperly fitting centering arrangement and gripper jaws would slide by force along the workpieces which they have enclosed so that defective work would be produced.

In accordance with the present invention, there is provided means for insuring the proper alignment of workpieces for the machining work and for thereafter transferring the workpieces to a conveyor for removal from the machine. The apparatus includes a projection device which stops the machine and/or the changing device, either singularly or, preferably, both together. This stopping is effected when there is any disturbance which would cause a misalignment of the workpieces which are to be machined. The arrangement for changing the workpieces includes a movable element which is arranged in relation to the clamping device of a machine, such as a hobbing machine, and which includes at least one elastic part which transfers the workpiece displacing motion from a driver, for instance, a hydraulic piston, to an element, for instance, a plunger with at least one switching device, for stopping the changing device and/or the machine. The stopping occurs only when the elastic part of the device is changed in shape due to the misalignment of the workpieces in the centering device, for example.

In accordance with another embodiment of the invention, the driving element is arranged for transferring the downward motion of the element, for instance, the plunger, carrying the swivel head over one elastic element and for transferring the upward motion over another elastic element.

The change in shape of the elastic element occurs when an unusually high resistance opposes the loading motion of the work into the clamping device which would be due to a misalignment of the workpiece or an improper discharge of a previous workpiece, etc. Since there is always a certain amount of resistance that is provided by the workpiece during the movement of the centering arbor into the bore of the workpiece, the elastic member must be provided with a certain displacement force before it is actuated to stop the machining operation. The arrangement advantageously includes means for setting the elastic member, either for discontinuance of the operation of the machine during a large force deviation or a small deviation in accordance with the selected tolerance. The adjustment of the elastic element is made so that the elastic element will react in a sense of change of shape at first when the normal loading resistance is exceeded for the present tolerance.

In a preferred arrangement, the elastic element consists of a package of disc-type springs. The switching device comes into effect due to the influence of the elastic element and can start, according to the invention, any one or more of the following switching processes:

(1) The driver for the element inserting the work into the clamping device executes a motion which removes the element from the clamping device.

(2) A gripping device, preferably the jaws of the loading grippers of the swivel head which is provided on the element which transfers the work to the clamping device, releases the work.

(3) The conveyor equipment which transfers the work into the working range of the work changing equipment will be stopped.

Accordingly, it is an object of this invention to provide an improved device for the protection of automatic work changing equipment on machines.

A further object of the invention is to provide a device for positioning workpieces in a machine including means for shutting off the machine and/or the workpiece changing device upon the misalignment of the workpieces.

A further object of the invention is to provide a device for inserting the workpiece into a machine centering arbor including means for stopping the operation of the machine should the device for positioning the workpiece be subjected to a force exceeding a predetermined amount.

A further object of the invention is to provide a device for the protection of automatic work changing equipment on machines such as hobbing and milling machines which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

In the drawings:

FIG. 1 is a somewhat schematic and somewhat diagrammatic indication of a hobbing machine with an automatic work changing device constructed in accordance with the invention; and FIG. 2 is a partial digrammatic indication of another embodiment of work protecting device for the machine indicated in FIG. 1.

Referring to the drawings in particular, the invention embodied therein includes a hobbing machine generally designated 30 which includes a workpiece mounting base or clamping assembly 3 upon which is located a centering arbor 31 for workpieces 9 carried in grippers 6. The workpieces 9 are centered for operation thereon by a tool 32 formed at the lower end of a tail stock support 2.

The tail stock support 2 carries an axially displaceable and rotatable plunger member 4 which carries at its lower end a swivel head 5. The swivel head 5 carries at one of its ends the loading gripper 6 and at its opposite end a second loading gripper 6a which is also indicated in engagement with workpieces 9a which have been already machined. In the position indicated in the drawings, the workpieces 9a which have been removed from the arbor 31 by rotation of the swivel head 5 are presented over an upstanding conveyor stud 71 on a moving conveyor member 7.

The tail stock support 2 is supported on an upstanding bracket or support 1 for vertical reciprocation under the guidance of a piston 15 which reciprocates in a cylinder 36. A pressure control device 38 is actuated by electrical or similar means (not shown) to selectively pressurize one side or the other of the cylinder 36 in order to reciprocate the piston 15 in the desired direction. A piston rod 16 interconnects the piston 15 with the tail stock 2.

A piston rod 11 is axially slidable in the tail stock support 2 and is connected to a piston 10 in a cylinder 42 at the lower end thereof. A lever arm 14 includes a hubbed portion or housing 13 which is slidable on the piston rod 11 but normally moves in an axial direction therewith. The arm 14 is held between side flanges of a sleeve 44 secured to the plunger 4. The piston 10 normally effects movement of lever arm 14 via rod 11. If the plunger 4 does not move due to an obstruction the rod 11 acts on a package of disc-type springs 12 which are contacted by a flange 17 on the piston rod 11 so that the downward movement of the piston 10 causes compression of the springs 12.

The pre-load of the package of disc-type springs 12, which are clamped between the housing 13 at one end of the flange 17 at the other end, is changeable by an adjusting element or screw nut 20. A switch 18 is secured to the housing 13 and it carries a contact pin 181. A bracket 19 is secured beneath contact pin 181 on rod 11. The housing 13 with the switch 18 moves relatively to the bracket 19 under the influence of the movement of the piston 10 only when movement of rod 4 is prevented. The amount which the springs 12 are compressed by this movement controls the operation of a contact pin 181 which bears against the bracket 19. Thus, the downward force of the piston 10 necessary to properly center the workpieces 9 on the arbor 31 is sensed by the contact pin 181 and if this force exceeds a predetermined amount as set by the spring elements 12 of the machine operating mechanism or movement of the piston 10 it will be disrupted.

In FIG. 1 the automatic work changing device is indicated in the working position in which the tail stock support 2 is lowered in the direction of the arrow 48 as controlled by the movement of the piston 15 by the control mechanism 38. This movement effects the positioning of the workpiece load 9 into the centering arbor 31 of the clamping device 3 and the already machined load 9a is moved onto the conveyor stud 71 of the chain magazine 7 to be hobbed by the tool of another hobbing machine (not shown) during the next work cycle. After the loading grippers 6 and 6a have been released from the load 9 and 9a, a lifting motion is executed by the plunger 4 with the aid of the piston 10 which presses the piston rod 11 upward together with the movable housing 13 whereby the rod 14 fastened to the housing moves the plunger 4 in the same direction. At this time there is sufficient room under the loading gripper 6a to move the chain magazine the amount sufficient to be able to transfer the machined workpieces into the loading position.

After the work cycle has been completed, the plunger 4 and the loading grippers 6 and 6a are lowered and each grasps a load 9 and 9a. Now the tail stock support 2 is lifted by means of the hydraulic cylinder 15. The load 9 is thereby lifted from the centering arbor 31 of the clamping device 3 and the load 9a from the conveyor stud 71 of the chain magazine 7. The swivel head rotates by 180° due to the influence of a driving means (not shown) and the load 9a arrives over the clamping device 3 and its centering arbor 31, but the finished machine load 9 is located over the conveyor stud 71 of the chain magazine 7. The load 9a will be pushed into the arbor 31 and the load 9 into the stud 71 by the following downward motion of the tail stock support 2 caused by the actuation of the piston 15 in the direction of the arrow. The plunger 4 is then lifted by means of the piston 10 after the loading grippers 6 and 6a are released as has been heretofore described.

If the downward movement of the housing 13 is intercepted, the piston 10, the plunger 4 and the rod 11 continue their downward movement and compresses the package of disc-type springs 12. The contact pin 181 thereupon withdraws from the bracket 19, which bracket is fastened to the piston rod 11. This only occurs if an unusual resistance opposes the downward movement of the plunger 4 in relation to the tail stock support 2, due, for example, to an improperly located workpiece load or a machine load which has been left on the centering arbor 31 of the machine, due to an error. The switching process will then cause the stopping of all of the automatic operation of the machine until the machine has been reset. In the embodiment indicated in FIG. 2, the rod 11 is directly connected to the piston 10 as in the previous embodiment and it includes a shoulder 17a at the lower end in addition to the shoulder 17 at the upper end. The rod 11 is slidable in the housing 13 which contains the connecting rod 14 which is held in the collar 44. Downward movement of the piston 10 causes the shoulder 17 to compress the springs 12 and to bring the projecting contact bracket 19 into association with the switch 181, and at the same time sufficient downward movement will cause the bracket 19a to move away from the switch 181a to cause it to disrupt the operating circuit. Upward movement of the piston 10 will effect movement of the bracket 19 away from the switch 181 to cause disruption of the circuit upon the compression of the springs 12 and 12a beyond the predetermined amount. Thus, the embodiment in FIG. 2 works to stop operation of the machine upon the exceeding of a movement in either direction beyond a predetermined amount. In each of the embodiments, the springs 12 and 12a may be set for the desired pressure operation. In addition, switches 18 and 18a may also be set if desired.

The flange or shoulder 17 of the piston rod 11 is provided with the bracket 19 and the flange of shoulder 17a is provided with the bracket 19a. If the piston rod 11 moves downward if the housing 13 is delayed, then the contact pin 181 is pressed by the bracket 19 whereby the operation of the device is stopped. In case the housing 13 does not join the upward movement of the piston rod, since, for instance, an already machined load 9 cannot be lifted from the clamping device by the loading grippers as it is locked by machined chips or for other reasons in the centering arbor, then the contact pin 181 will get pressed by the bracket 19a whereby the stopping of equipment is effected.

The disc-type springs 12 and 12a serve in each of the embodiments to make the displacement of the housing 13 relative to the piston rod 11 depend upon compression thereof. The switches are arranged to operate only when the compression exceeds a certain limit.

While specific embodiments of the invention have been shown and described in detail to illustrate the application of the invention principles, it will be understood that the invention may be embodied otherwise without departing from such principles.

What is claimed is:

1. A device for the overload protection of automatic work changing mechanism for a machine such as a milling machine, comprising a supporting frame, a head stock support vertically displaceable along said supporting frame, a workpiece clamping device including a centering arbor disposed below said head stock, a workpiece supporting rod vertically displaceable in said head stock, a workpiece loading gripper on said workpiece supporting arm movable with said arm toward and away from said centering arbor, a displaceable rod member displaceably mounted in said head stock, a hubbed arm slidably mounted on said rod member and having an extending portion connected to said workpiece supporting rod for displacement thereof, said rod member having a flange portion, a resilient spring assembly disposed between said flange portion of said rod member and said hubbed arm member, and means for displacing said rod member to displace said hubbed arm member through said springs and to move said workpiece supporting arm accordingly, said spring assembly being compressible upon said centering arbor offering resistance to movement of said workpiece supporting arm, and means responsive to compression of said spring assembly beyond a predetermined amount to stop the operation of said machines.

2. A device according to claim 1, including means for reciprocating said head stock.

3. A device according to claim 1, wherein said workpiece holding grippers includes a swivel head with grippers on each end thereof, said workpiece supporting rod being rotatable in said head stock.

4. A device for the overload protection of automatic work changing mechanism for a machine such as a milling machine, according to claim 1, wherein said spring assembly includes disc spring members.

5. A device for the overload protection of automatic work changing mechanism for a machine such as a milling machine, according to claim 1, wherein said spring assembly is adjustable.

6. A tool changing device with an overload safety device for use in machine tools, comprising a clamping assembly for work pieces, a member reciprocatable toward and away from said clamping assembly, a rod element mounted for reciprocation at said member and having clamping means on an end thereof which is adjacent said clamping assembly, a drive piston movable for displacing said rod element relative to said reciprocating member, elastic means connected between said rod element and said drive piston for transmitting relative movement from said drive piston to said rod element, said elastic means being compressible to an amount which is dependent upon the force emanating from said clamping means in respect to a work piece on said clamping assembly, said elastic means, upon compression, permitting a relative displacement between said drive piston and said rod element, and switching means for stopping the machine including a portion disposed for contact by said rod element beyond a predetermined amount to stop said machine.

7. A tool changing device according to claim 6, wherein said elastic means are arranged to permit relative displacement of said drive piston relative to said rod element in both directions.

References Cited in the file of this patent

UNITED STATES PATENTS

| | | |
|---|---|---|
| 2,366,960 | England | Jan. 9, 1945 |
| 2,407,537 | Chapman | Sept. 10, 1946 |
| 2,494,847 | Welch | Jan. 17, 1950 |
| 2,588,066 | Weisberg | Mar. 4, 1952 |
| 2,782,689 | Carlsen et al. | Feb. 26, 1957 |
| 2,937,734 | Sommer | May 24, 1960 |

FOREIGN PATENTS

| | | |
|---|---|---|
| 1,140,818 | France | Mar. 4, 1957 |